May 27, 1941.　J. W. BISHOP　2,243,521

ELECTROFORMING METHOD OF MAKING TIRE MOLDS

Filed Aug. 4, 1938

INVENTOR.
JOSEPH W. BISHOP

BY *Gourley & Budlong*
ATTORNEYS.

Patented May 27, 1941

2,243,521

UNITED STATES PATENT OFFICE 2,243,521

ELECTROFORMING METHOD OF MAKING TIRE MOLDS

Joseph W. Bishop, Detroit, Mich., assignor, by mesne assignments, to United States Rubber Company, New York, N. Y., a corporation of New Jersey Application August 4, 1938, Serial No. 222,978

2 Claims. (Cl. 204—6)

This invention relates to molds, and in particular it relates to improved features of construction and processing of pneumatic tire molds by electro-deposition of a ferrous metal.

In general, the invention comprises a method of forming a pair of mold sections including the steps of: applying a rubber composition to an annular core, placing the core and rubber composition in a pre-formed mold having a transverse dimension, that is, a dimension parallel to the central perpendicular axis of the annular core, which is substantially greater than the transverse dimension desired in the completed mold sections; vulcanizing the rubber composition to provide an annular form; coating the form with a ferrous metal by electro-deposition; severing the deposited metal circumferentially along a central plane perpendicular to the axis of said core to produce a divided shell; removing the form and core from the shell; and trimming the edges of the divided shell to form a pair of complementary transaxially divided mold sections.

In the manufacture of complementary mold sections by the electro-deposition process it has been customary to form each mold section separately, either from the same pattern or from a similar pattern. It has been found difficult to form two separate mold sections which fit together in satisfactory complementary relation. Shrinkage, temperature and rate of deposit of the ferrous metal are variable factors which result in differences in the complementary mold sections.

By forming a mold in one piece by electro-deposition and thereafter separating it into mold sections by means of a machine operation, a substantially perfect alignment of the complementary mold sections is obtained.

Among the objects of the invention are, to provide uniformity in thickness of complementary mold sections, to provide uniformity in alignment of complementary mold sections, to reduce the amount of equipment required to produce a complete mold within the same time period, and to lower the cost of mold manufacture.

These and other objects and advantages will appear more fully in the following detailed description when considered in connection with the accompanying drawing, in which.

Figure 1:
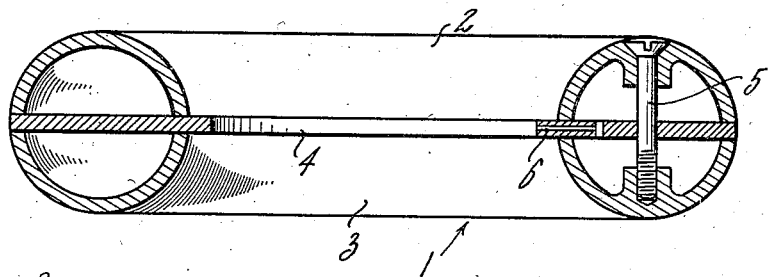
Fig. 1 is a view, in transverse section, of a core member.

Referring to the drawing, I show by way of example a preferred method of practicing the invention. The first step in the process is to provide a suitable core 1 such as shown in Fig. 1. The core 1 is an annular, hollow member having a circular cross section. While the core may be of any solid, rigid material, I prefer to make it hollow so that its weight will not be objectionable during subsequent handling.

Specifically, the core 1 is formed of two transaxially divided, annular portions 2 and 3 separated by a spacer 4, and clamped together by means of a plurality of machine screws 5. A portion of the spacer 4 extends radially inward from the core 1 and functions as a mold separator in a subsequent step of the process. An aperture 6 in the spacer 4 communicates with the interior of the core for the purpose of permitting escape of gases which may accumulate within the core during the subsequent vulcanizing operation.

The core functions to support the actual form upon which a metallic shell is electro-deposited. To prepare the core for the reception of a layer of rubber composition it is preferable to coat its exterior surface with an adhesive paint such as rubber cement. Sufficient rubber composition is placed on to the core to fill completely the mold cavity shown in Fig. 2. In this view the core 1 and rubber composition or form 7 are shown positioned within a tire vulcanizing mold including upper and lower mold sections 8 and 9. An additional spacer ring 10, complementary to the spacer 4, separates the remaining portion of the contacting faces of the mold sections 8 and 9. The tire mold composed of sections 8 and 9 may be of conventional form, and the purpose of the spacers 4 and 10 is to separate the mold sections to the extent that the completed form 7 will have a dimension transversely thereof greater than the same dimension of the completed mold or tire resulting from the practice of the process.

While some success can be attained by providing the form 7 composed completely of rubber composition, that is, by eliminating the core 1, it is desirable to utilize such a core because it occupies a substantial portion of the cross sectional area of the form, and consequently eliminates a considerable amount of shrinkage and distortion in the rubber composition comprising the form 7.

Figure 2:
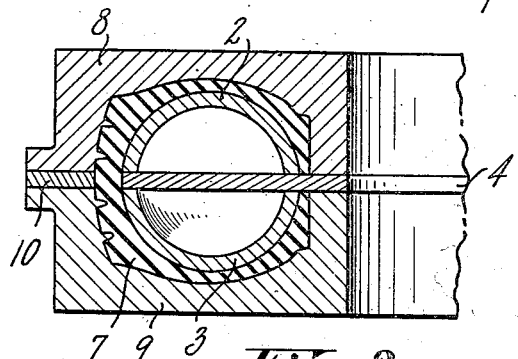
Fig. 2 is a view, in transverse section, of a portion of a mold for forming a pattern.

When the rubber composition comprising the form 7 is completely vulcanized in the mold, as shown in Fig. 2, the outer profile assumes the shape of a pneumatic tire, including the desired antiskid tread configuration and such other insignia as ordinarily appear on such tires.

Figure 3:
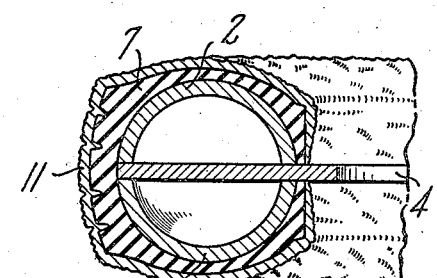
Fig. 3 is a view, in transverse section, of a portion of a mold, showing a metal layer deposited on the pattern.

After vulcanization the form 7 and core 1 are removed from the mold, and the form is prepared for electro-deposition of a ferrous metal. In this operation the outer surface of the form 7 may be treated to increase its electrical conductive characteristics, such as by painting the surface with a graphite or copper bearing paint. Thereafter, in accordance with conventional practices, the form is placed into a proper bath, and a shell 11 (Fig. 3) is formed on the pattern or form 7 by means of electro-deposition. For the purpose of making tire molds it is preferred that the deposited shell be composed principally of iron.

Figure 4:
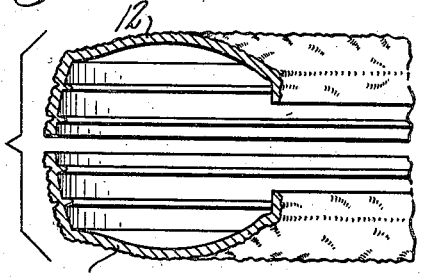
Fig. 4 is a view, in transverse section, showing a portion of a mold in the form of complementary sections of deposited layers of metal.

After a proper thickness of ferrous metal has been deposited on the form 7 to form the shell 11, the electro-deposition process is suspended and the assembly removed from the bath. Thereafter, the shell 11 is subjected to a machine operation in which the shell is cut on central transaxial plane to form separate mold sections 12 and 13 (Fig. 4). The cutting operation also frees the core 1. The rubber form 7 to which the ferrous metal is deposited adheres to the shell sections 12 and 13. In order to break the bond therebetween, the assembly is subjected to elevated temperatures sufficient to soften the rubber composition and to permit removal of the shell sections.

The thickness of the shell sections 12 and 13 is about ¼ inch. This thickness is insufficient for proper handling of tire molds. Furthermore, the rough exterior resulting from the electro-deposited metal is objectionable for handling purposes. Therefore, it is preferred practice to provide a backing 14 (Fig. 5) on each of the shell sections 12 and 13. Preferably, the backing is of a soft material such as aluminum. When a soft metal, as aluminum, is used for the backing it may be cast in place with the mold shell. Other methods of reinforcing the shell may be used, such as by building up the thickness of the metal by thermally atomizing a metal against the back of the mold shell. Whether the backing 14 is cast in place or thermally atomized, its outer surface is machined to provide a profile of standard dimensions adaptable for forming an insert.

Figure 6:
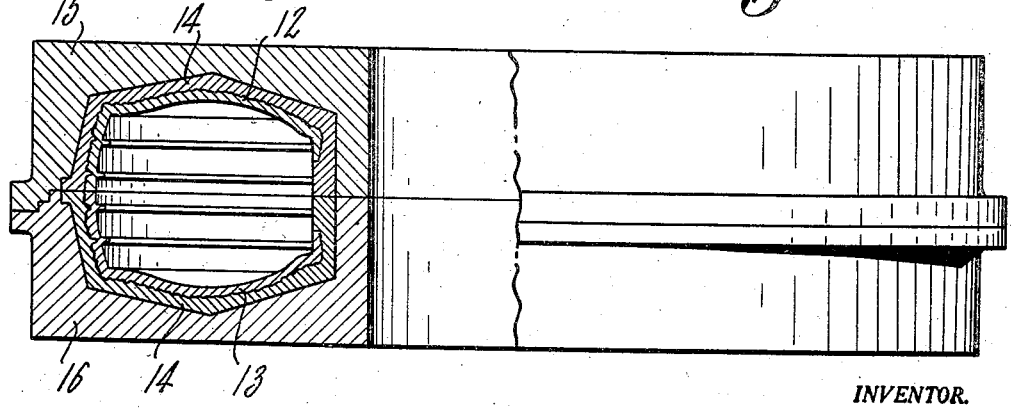

To complete the mold, the shells 12 and 13 with their backings 14 form inserts which are removably assembled with retaining members 15 and 16 (Fig. 6). By this arrangement it is possible to change the inserts whenever it is desired to change the pattern or profile of the molding cavity.

Figure 5:
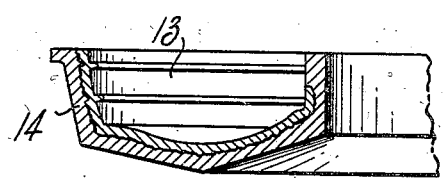
Fig. 5 is a view, in transverse section, of one of the mold sections reinforced by an additional metal backing; and, Fig. 6 is a side view, partially in section, of a complete, assembled mold.

The cross sectional width of the mold as formed by the deposited shell 11 is greater than that which is desired in the finished mold. Therefore, the width of the cut which is made along the transaxial plane of the shell 11 in order to form the shell sections 12 and 13 is such that the shell sections 12 and 13, when placed in complementary relationship, will provide the proper cross sectional width for vulcanizing a tire therein. If desirable, a relatively narrow cut may be made in order to separate the shell sections. The shell sections may be subjected to additional machining in a subsequent operation, such as after the backing 14 is applied to the shells, as shown in Fig. 5.

By providing a form having a cross sectional profile of a pneumatic tire, and by depositing a metallic shell onto this form and subsequently separating the shell members, it is possible to provide a complementary pair of mold sections which, to a high degree of precision, will match in complementary relationship, regardless of variations in the form due to shrinkage.

As thus shown and described, it is apparent that I have provided a unique method of forming tire molds in which accuracy of reproduction, efficiency in operation, and economy in manufacture are primary features.

While I have thus shown and described a preferred method of practicing my invention, it is to be understood that it is susceptible to modifications which are intended to be included within the invention as defined by the scope of the appended claims.

Having thus described my invention, what I claim and desire to protect by Letters Patent is:

1. The method of forming a pair of complementary mold sections comprising the steps of applying a layer of rubber composition to a rigid core, placing the rubber composition and core between a pair of pre-formed mold sections having the same interior dimensions as those to be produced in the mold sections resulting from the process, placing a spacer of substantial thickness between the adjacent surfaces of the pre-formed pair of mold sections, said rubber composition and core being of such combined volume as to completely fill the cavity formed within the mold sections and spacer, vulcanizing the rubber composition to said core, removing the rubber composition and core from the mold sections, forming a layer of metal about the rubber composition by electro-deposition, and cutting and removing that portion of the electro-deposited metal layer occupying the space about the rubber composition formerly occupied by the spacer so as to form a pair of complementary mold sections.

2. The method of forming a pair of complementary tire mold sections comprising the steps of applying a layer of rubber composition to a rigid annular core, placing the rubber composition and core between a pair of pre-formed tire mold sections having the same interior dimensions as those to be produced in the mold sections resulting from the process, placing a spacer of predetermined thickness between the adjacent surfaces of the pre-formed pair of mold sections, said rubber composition and core being of such combined volume as to completely fill the cavity formed within the mold sections and spacer, vulcanizing the rubber composition to the core, removing the rubber composition and core from the mold sections, forming a layer of metal on the rubber composition by electro-deposition, and cutting the deposited metal along the transaxial plane about the rubber composition formerly occupied by the spacer to form separate complementary mold sections while removing substantially all of the metal occupying the space formerly occupied by the spacer.

JOSEPH W. BISHOP.